No. 694,126. Patented Feb. 25, 1902.
S. P. A. ANDERSSON.
CHURN.
(Application filed Dec. 29, 1897.)
(No Model.) 2 Sheets—Sheet 1.
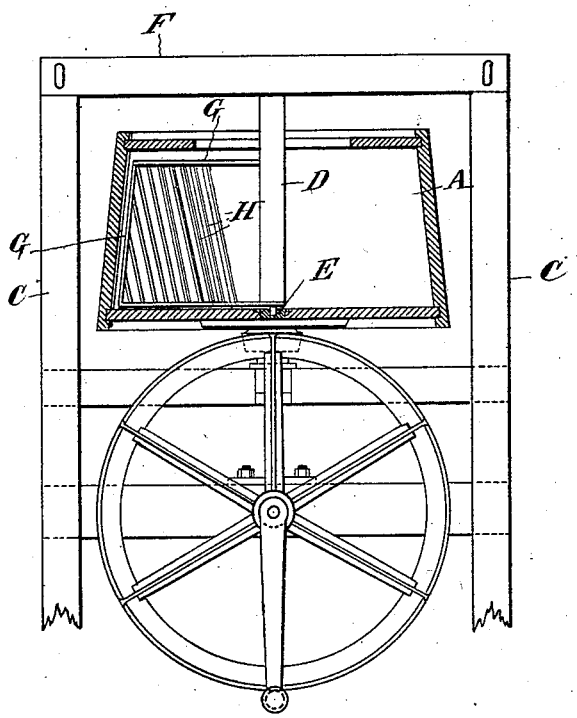
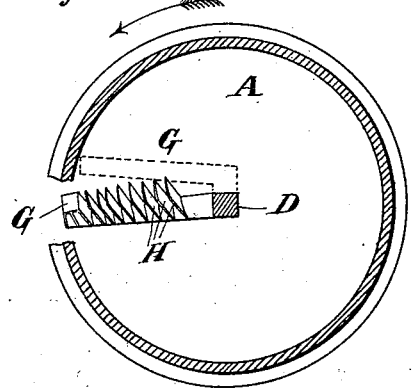
WITNESSES: INVENTOR
Sven P. A. Andersson
BY
Henry Connett
ATTORNEY

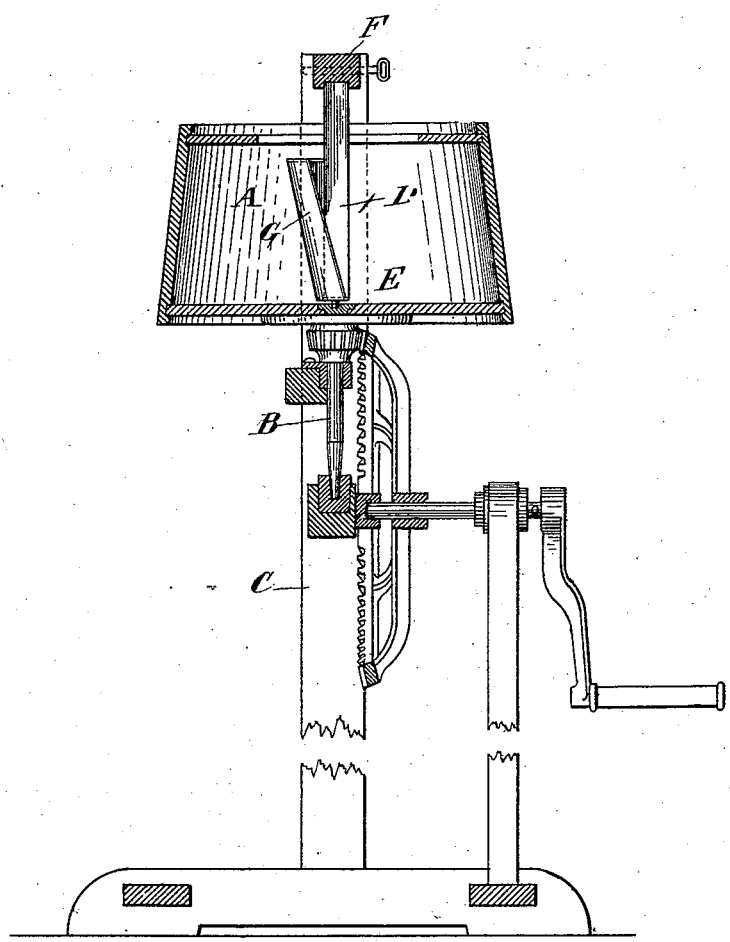

UNITED STATES PATENT OFFICE.

SVEN PETTER AXEL ANDERSSON, OF BACKASANDS GÅRD, ÖDESHÖG, SWEDEN.

CHURN.

SPECIFICATION forming part of Letters Patent No. 694,126, dated February 25, 1902.

Application filed December 29, 1897. Serial No. 664,446. (No model.)

*To all whom it may concern:*

Be it known that I, SVEN PETTER AXEL ANDERSSON, engineer, a subject of the King of Sweden and Norway, and a resident of Backasands gård, Ödeshög, in the Kingdom of Sweden, have invented certain new and useful Improvements in Centrifugal Churns, of which the following is a specification, reference being had therein to the accompanying drawings.

This invention relates to the class of centrifugal churns wherein stationary agitators depend into the rotating drum or cream-container; and it has for its object to improve the form of such pendent agitating devices. To this end, in the present invention the agitation of the cream necessary to the formation of butter is effected by a grating fixed in the rotating cream-container and which the cream is allowed to strain through. The grating, which as a whole forms a vane which is placed radially, is composed of thin and broad knives or plates having their edges pointing opposite to the direction in which the body of cream rotates. The said knives are preferably so located that when viewed on their cross-section they are not quite perpendicular to the radius of the container, said deflection being made different for different knives, whereby the resistance offered by the latter to the cream will cause the body of cream to be divided into layers obtaining differing angular velocities, and therefore developing friction one against another. By this means the efficiency of the apparatus is made very high, so that the churning operation can be completed in a few minutes.

In the accompanying drawings the cream-container is shown in Figures 1 and 2 in vertical sections viewed from two different sides, and in Fig. 3 in a horizontal section.

The cream-container or vessel A is mounted on its shaft B in a frame C, in which it can be kept rotating by means of suitable gearing. Its head is provided with a central opening through which is inserted a rigid support D, square in section and provided at its lower end with a small pin E, that enters into a small journal-box at the bottom of the container A. The upper end of the support D is let into the removable girth F of the frame, being thus held firmly in position and prevented from turning around. To the support is attached a frame G, on which are secured the thin knives or plates H, mentioned above. The grating thus formed may be given a vertical position, though preferably being made inclined somewhat to the vertical plane, as shown in the drawings, and the entire grating may be slightly twisted, so as to give it an increasing inclination in the direction of the periphery of the container, all for the purpose of causing the knives to cut through the body of cream with greater facility. The individual knives are inclined slightly to the axis of rotation of the vessel and placed so as to turn their broad sides toward said axis, as seen in Figs. 1 and 3. The outermost knife when viewed on its cross-section is substantially perpendicular to the radius, the next one is slightly oblique to said radius, and the next one is still more oblique, &c., the innermost knife having the greatest obliquity. The knives thus occupy diverging positions with reference to one another. When the container is rotated in the direction indicated by the arrow in Fig. 3, so as to cause the cream to pass between the knives that are set close together, the cream will be gathered or drawn inward while passing between the knives toward the center of the container, to be then flung outward by the centrifugal force. Owing to the varying resistance, the latter being greatest at the inner knives and decreasing toward the periphery, a motion will be brought about in the mass about as if the latter were divided in layers corresponding to the spaces between the knives and the said layers were sliding one on another. This may serve to explain the great efficiency that this churn has been found to develop. The knives, which are preferably made slightly warped, are made of stiff sheet metal and may or may not be provided with such known means—as corrugations, points, or the like—as are commonly used for agitating the cream. The action of the grating will evidently be the same as that described even if it be overturned, so that the knives get a horizontal position. The cream will then be forced against the bottom of the container, and thus toward the center of the latter. In the above-mentioned inward motion of the cream (or milk) the butter formed is thrown toward the center, where it collects in the portion of the container not occupied by the cream, forming a more or less coherent lump. It is evident that two or more gratings may be used issuing from the same support D.

Having now described my invention, what I claim as new, and desire to secure by Letters Patent, is—

1. In a centrifugal churn, the combination with the rotatable vessel or cream-container, the rigid support therein, and the frame fixed to said support within the drum, of the sheet-metal strips or knives fixed in said frame as a grating, said knives being inclined outward from the axis of rotation at their upper ends and having their edges directed toward the current of cream caused by rotation of the vessel.

2. In a centrifugal churn, the combination with the rotatable vessel or cream-container, the rigid support therein, and the frame fixed to said support within the drum, of the sheet-metal strips or knives fixed in said frame as a grating, said knives being inclined outward from the axis of rotation at their upper ends, having their edges directed toward the current caused by rotation of the vessel, and the series of knives in their frame having their lower ends in one radial plane and their upper ends in another radial plane.

3. In a centrifugal churn, the combination with the rotatable vessel or cream-container, the rigid support therein, and the frame fixed to said support within the drum, of the sheet-metal strips or knives fixed in said frame as a grating, said knives being inclined outwardly and toward the current at their upper ends, and being concave on their inner faces.

In witness whereof I have hereunto signed my name in the presence of two subscribing witnesses.

SVEN PETTER AXEL ANDERSSON.

Witnesses:
ERNST SVANGVIST,
A. T. LUNDBORG.